United States Patent [19]
Das

[11] Patent Number: 5,887,014
[45] Date of Patent: Mar. 23, 1999

[54] PROCESS FOR SELECTING OPERATING RANGE FOR NARROW BAND EXCIMER LASER

[75] Inventor: Palash P. Das, Vista, Calif.

[73] Assignee: Cymer, Inc., San Diego, Calif.

[21] Appl. No.: 915,030

[22] Filed: Aug. 20, 1997

[51] Int. Cl.$^6$ .............................. H01S 3/22; H01S 3/223
[52] U.S. Cl. ................................................................ 372/59
[58] Field of Search ........................................ 372/58, 59

[56] References Cited

U.S. PATENT DOCUMENTS

| | | | |
|---|---|---|---|
| 4,959,840 | 9/1990 | Akins et al. | 372/57 |
| 4,983,039 | 1/1991 | Harada et al. | 372/57 |
| 5,142,166 | 8/1992 | Birx | 307/419 |

*Primary Examiner*—Rodney Bovernick
*Assistant Examiner*—Robert E. Wise
*Attorney, Agent, or Firm*—John R. Ross, Esq.

[57] ABSTRACT

A process for selecting an operating range for a narrow band KrF or ArF excimer laser. The laser is operated at a desired pulse energy until the fluorine concentration has depleted sufficiently so that the charging voltage needed for the desired pulse energy is at or near a predetermined maximum range. The average charging voltage, the average line width, and the average energy sigma are recorded; and the fluorine concentration is estimated or determined. A quantity of fluorine, at least sufficient to cause a measurable decrease in the charging voltage needed to produce the desired pulse energy, is injected; and another set of data is recorded. Another similar quantity of fluorine is injected, and another set of data is recorded. These two steps are repeated until the voltage is at or near a predetermined minimum voltage range. The recorded data are used to select an optional operating range. The data may be plotted to make the selection easier. The selection criteria may be determined based on the needs of the laser user. Normally, the selection process will involve an intelligent compromise in which minimum values of charging voltage, fluorine concentration, line width and energy sigma are desired. For most uses, the optimal operating range will be a voltage range of 20% of the total possible voltage range and not close to either the minimum operating range or the maximum operating range.

6 Claims, 3 Drawing Sheets

PROCESS FOR SELECTING OPERATING RANGE FOR NARROW BAND EXCIMER LASER

This invention relates to excimer lasers and, in particular, to narrow band excimer laser.

BACKGROUND OF THE INVENTION

KrF excimer lasers are rapidly becoming the most important light source for integrated circuit lithography. Units currently being sold typically operate at a pulse repetition rate of about 1000 Hz, producing 10 mJ pulses at a wavelength of about 0.248 micron with a bandwidth of about 0.5 m.

Although these lasers are very complicated machines, their reliability has greatly improved during the past few years, and they are currently being integrated into fullscale integrated circuit production.

A detailed description of a KrF laser system is described in U.S. Pat. No. 4,959,840 issued Sep. 25, 1990 (incorporated herein by reference), and assigned to Applicant's employer. As explained in that patent, the excimer gain medium is produced by electric discharges between two elongated electrodes in a flowing gas medium which may be a combination of Krypton, fluorine and a buffer gas, neon. The proportions are typically 0.1 percent fluorine, 1.0 percent krypton and the rest neon. The operating pressure is about 3 atmospheres. The partial pressure of the fluorine is in the range of about 25 kPa of 1 percent $F_2$ in a buffer gas, such as Neon.

It is known that within the normal operating range of the KrF laser, output pulse energy can be increased by increasing the pulse discharge voltage; and it can be increased by increasing the fluorine concentration. Increases or decreases in both or either of these parameters is easily accomplished with these narrow band KrF excimer lasers.

Fluorine gas is extremely reactive, and in spite of great efforts to utilize materials which are compatible with fluorine, reactions do occur in the chamber depleting the fluorine, especially during and immediately following the electrical discharges during which time the fluorine is ionized.

A typical operating plan for producing constant laser pulses is to compensate for the fluorine depletion by increases in the discharge voltage. This is accomplished with a feedback control which monitors pulse energy on a "per pulse" basis at pulse frequencies such as 1,000 Hz and controls the voltage to maintain substantially constant pulse energy as the fluorine concentration decreases over time. Normally the operating plan will encompass a voltage control range so that when the voltage increases to compensate for the depleted fluorine, reaches an "upper limit" (usually requiring a period of about two hours), a quantity of fluorine is injected during a period of a few seconds. The quantity injected is predetermined to correspond to roughly to the quantity which would have been depleted over the two-hour period. During the fluorine injection period, the automatic feed back control will force the voltage down in order to keep pulse energy substantially constant so that at the end of the injection period the voltage is approximately at the low level of the voltage operating range and fluorine pressure is approximately at its high level. During the next two hours, the process will repeat, and this general process may continue for several days. FIG. 1 shows a graph of average voltage as a function of pulse count for an operating unit. Note that at a pulse rate of 1000 Hz, 1 million pulses correspond to about 16 minutes, and that for continuous operation, the injection period would be at intervals of about 1.3 hours, corresponding to about 5,000,000 pulses. (Often these lasers run at a duty factor of about 20–60 percent. Typically, the lasers do not operate when the lithography tool is changing positions, which would increase the time interval between injections to about several hours.)

Typical KrF lasers have a fairly broad possible range of operation within which the desired pulse energy can be achieved. For example, in one such laser the charging voltage range is from 567 volts to 790 volts, with the corresponding fluorine pressure range being 36.5 kPa to 18.5 kPa. The charging voltage produces a discharge voltage between the laser electrodes which is in the range of about 14,000 volts to about 20,000 volts and approximately proportional to the charging voltage. This high discharge voltage is provided through the operation of a magnetic pulse compression circuit such as is described in U.S. Pat. No. 5,142,166.

A lithographer may choose any operating range of about 40 volts within the 123-volt-charging voltage range. Prior art procedures for selecting the range were not well thought out. One manufacturer has recommended operation at 75% of the maximum voltage. Another suggested the range be determined based on pulse energy transfer efficiency. Choosing a range that is solely determined by a maximum energy transfer may severely limit the operating range of the laser. In such a case, the operating range would be based on the input voltage, pulsed power capacitances and inductances, gas pressure and gas mixture that would result in the maximum energy being transferred to the discharge from the stored energy in the pulse power system. Since the gas mixture changes (as the laser operates), the transfer of energy to the discharge changes. A simple technique to overcome this is to maintain fluorine relatively constant by injecting frequently. However, such frequent injections is, in many applications, not practical. Also; as described in U.S. Pat. No. 5,142,166; by using energy recovery circuits, even if the laser is not operated in maximum energy transfer regime, the residue energy in the circuit can be recovered for the subsequent pulse. Choosing the correct range can be important because both the operating life of the laser is adversely affected by increased fluorine concentration and also by increased discharge voltage. What is needed is a better process of selecting an operating range for narrow band KrF excimer lasers.

SUMMARY OF THE INVENTION

The present invention provides a process for selecting an operating range for a narrow band KrF or ArF excimer laser. The laser is operated at a desired pulse energy until the fluorine concentration has depleted sufficiently so that the charging voltage needed for the desired pulse energy is at or near a predetermined maximum range. The average charging voltage, the average line width, and the average energy sigma are recorded; and the fluorine concentration is estimated or determined. A quantity of fluorine, at least sufficient to cause a measurable decrease in the charging voltage needed to produce the desired pulse energy, is injected; and another set of data is recorded. Another similar quantity of fluorine is injected, and another set of data is recorded. These two steps are repeated until the voltage is at or near a predetermined minimum voltage range. The recorded data are used to select an optional operating range. The data may be plotted to make the selection easier. The selection criteria may be determined based on the needs of the laser user. Normally, the selection process will involve an intelligent compromise in which minimum values of charging voltage, fluorine concentration, line width and energy sigma are desired. For most uses, the optimal operating range will be a voltage range of 20% of the total possible voltage range and not close to either the minimum operating range or the maximum operating range. The concentration is preferably selected such that a small change in $F_2$ concentration does not cause a large change in voltage; otherwise, frequent injections will be required.

DETAILED DESCRIPTION OF PREFERRED EMBODIMENTS

Figure 1:
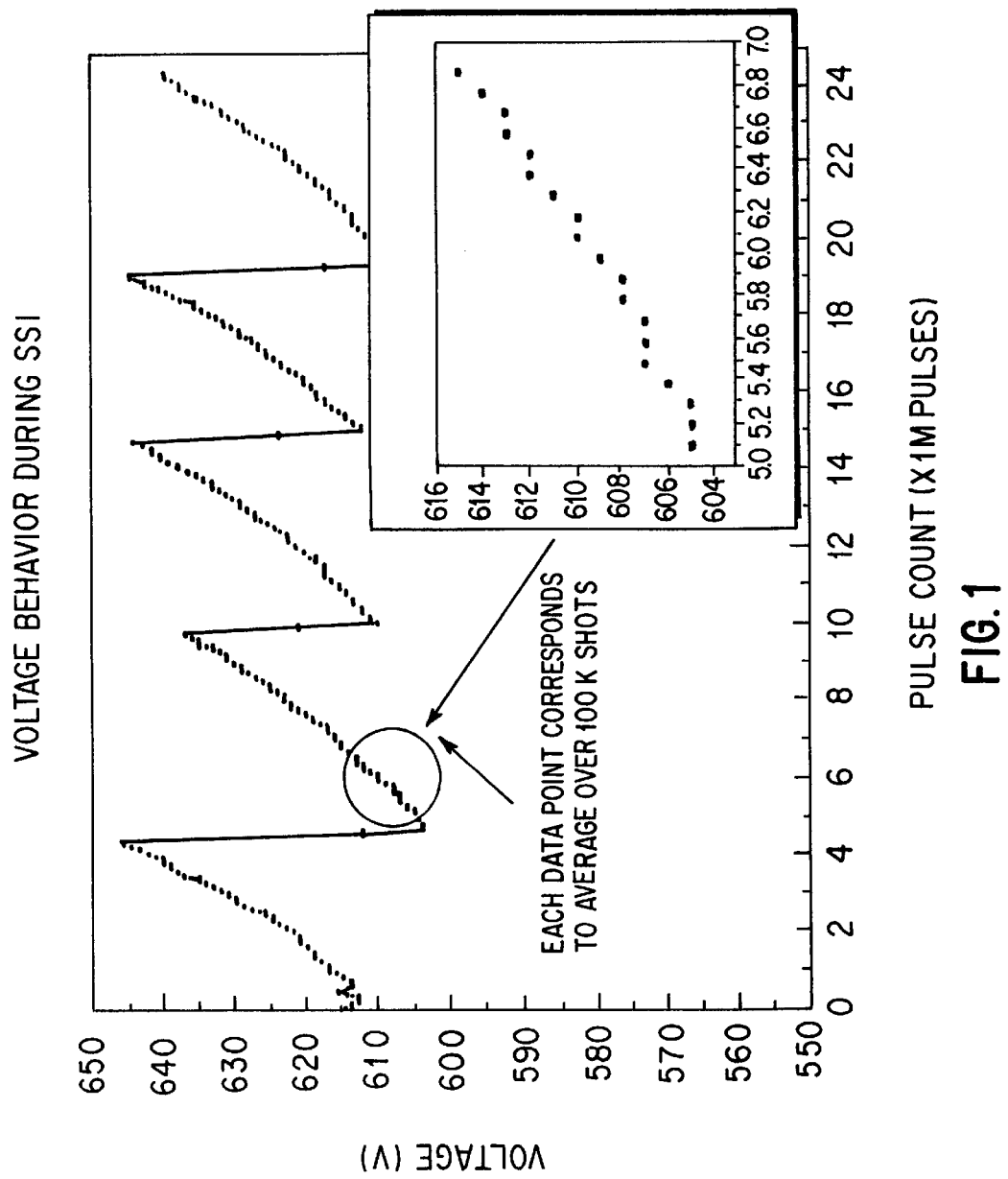
FIG. 1 is a graph of charging voltage as a function of pulse count for a typical KrF narrow band laser used for integrated circuit lithography.
Figure 2:
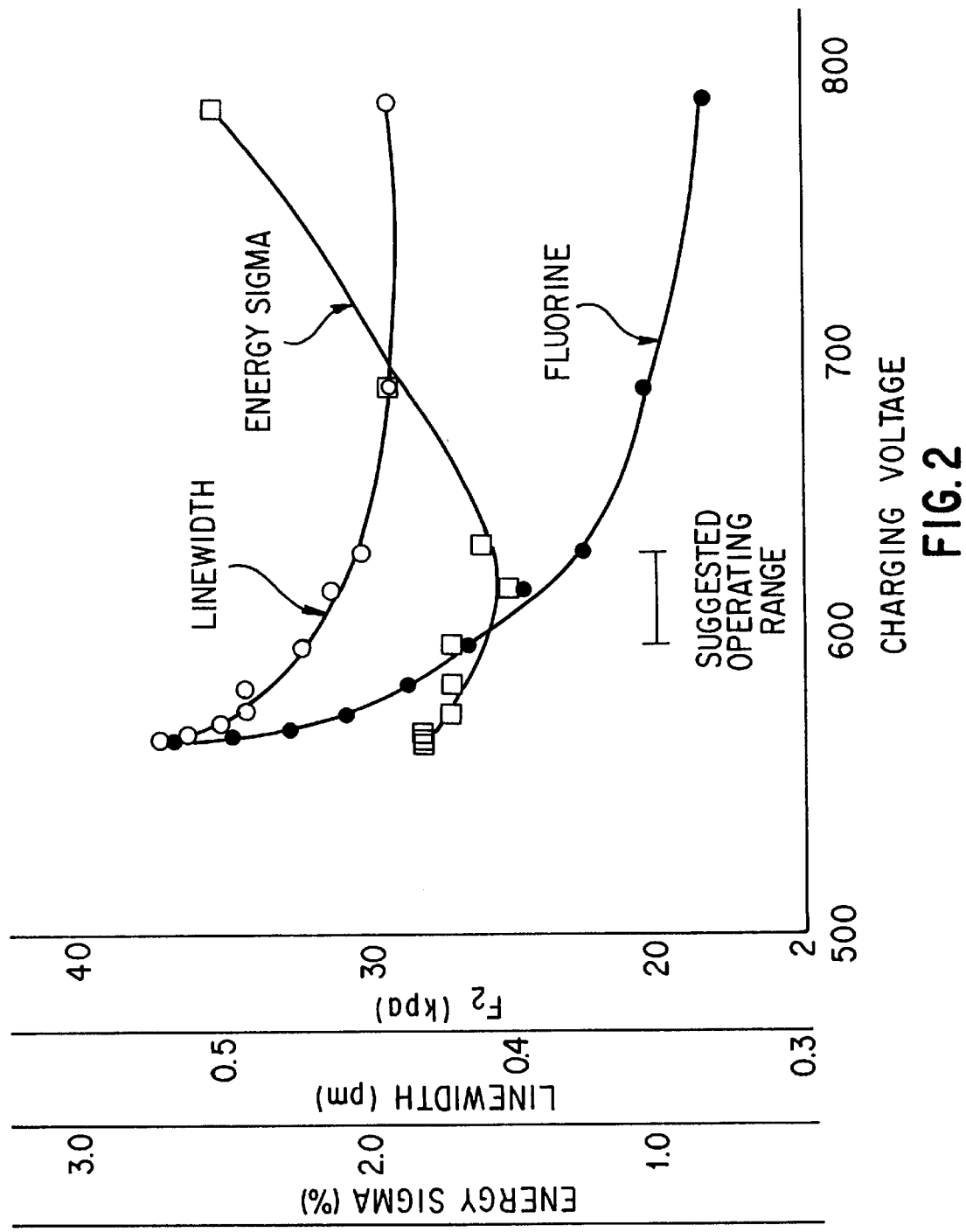
FIG. 2 is a typical blot of line width, energy sigma and fluorine concentration data as a function of charging voltage.
Figure 3:
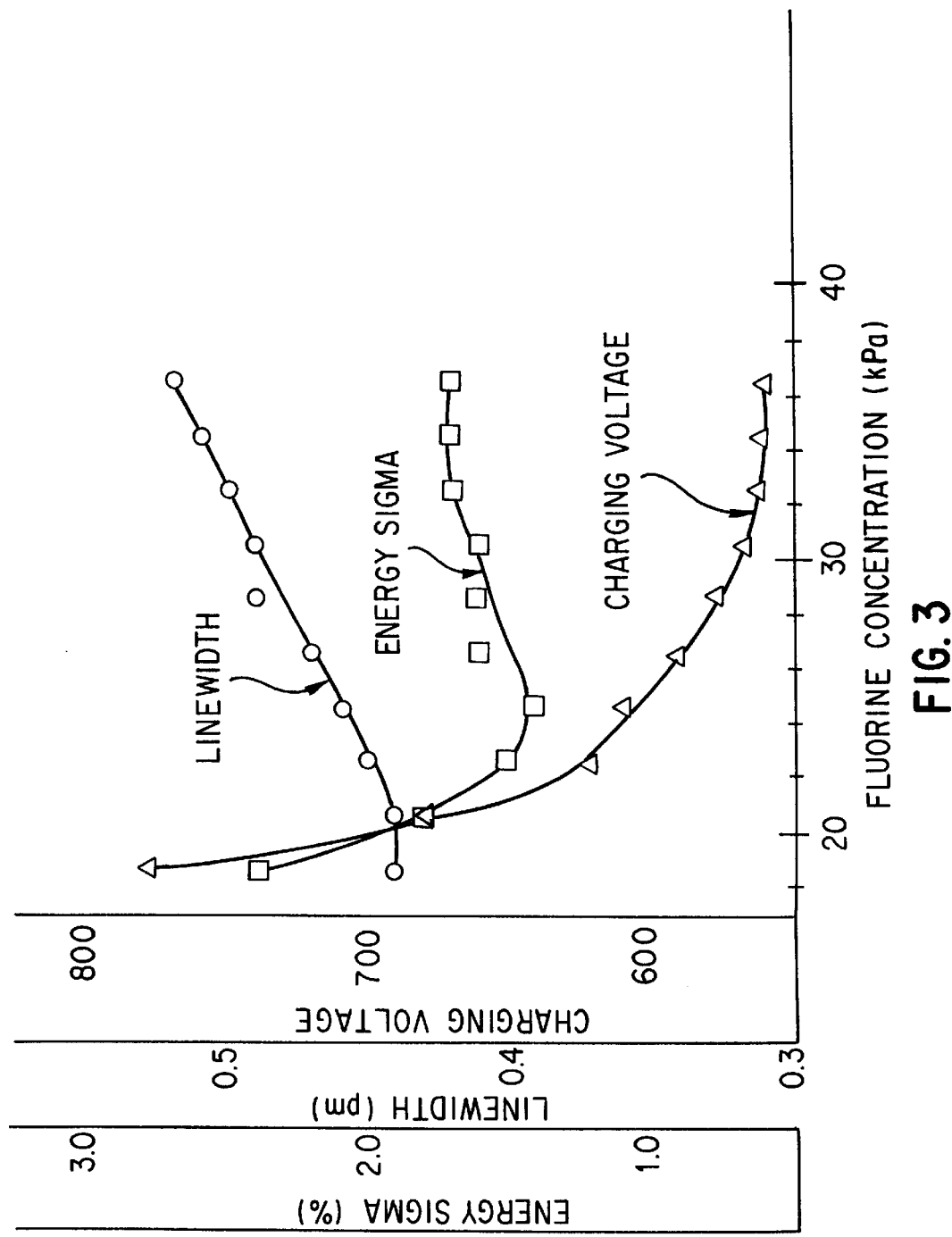
FIG. 3 is a typical plot of line width, energy sigma and charging voltage as a function of fluorine concentration.

A preferred process for selecting the operating range for a narrow band KrF excimer laser is described below.

This procedure permits a selection of the operating range to achieve improved laser performance, giving specific consideration to four important laser parameters. These parameters are discussed below. This embodiment refers specifically to a Model ELS-5000 KrF excimer laser available form Cymer, Inc., with offices in San Diego, Calif.; but the principles discussed herein can be applied with respect to any narrow band KrF or ArF excimer laser.

Charging Voltage

The possible voltage range for this particular excimer laser was 567 volts to 790 volts. The lifetime of several components of the laser, particularly the electrodes, and to a lesser extent chamber windows and pulse power equipment, are affected by operating voltage level. The higher the voltage, the more adverse the effect.

Fluorine

The possible fluorine pressure range for this particular laser was 18.5 kPa to 36.8 kPa corresponding to the above voltage range. High fluorine pressure also adversely affects the lifetime of laser components coming in contact with the gas. This includes windows, fan bearings and electrodes.

Line Width

For a narrow band excimer laser used in integrated circuit lithography, the bandwidth is very important. The preciseness of the circuit components depend on the bandwidth being within required limits. Specifications typically require a bandwidth of less than 1.0 pm for a KrF laser, but the desired bandwidth may be substantially smaller.

Energy Variation

Pulse energy variation, called "energy sigma," is also very important to integrated circuit lithographers. Specifications usually require an energy sigma of less than 3%, but the desired variation may be much smaller.

Range Selection Process

This preferred range selection process permits a careful, well-considered selection of an operating range to provide the best overall results taking into consideration all four of the above parameters and the needs of the particular lithographer.

Process

Step 1: Operate the laser at a desired pulse energy for a period of time sufficient to allow the fluorine concentration to decrease to a level corresponding to the upper limit of the discharge voltage.

Step 2: Record the charging voltage, line width energy sigma and estimated fluorine concentration.

Step 3: Inject a quantity of fluorine $\Delta F_1$. (Choose $\Delta F_1$ to be about 1/10 the difference in Fluorine concentration corresponding to the lowest charging voltage to produce the desired pulse energy and the fluorine concentration corresponding to the highest charging voltage to produce the desired pulse energy. Operate the laser for 5 minutes, then Step 4: Record (F est+$\Delta F_1$). Step 5: Inject a second quantity of Fluorine $\Delta F_2$. Step 6: Record charging voltage, line width, energy sigma estimated fluorine concentration (roughly F est+$\Delta F_1$+$\Delta F_2$).

Step 7: Inject a third quantity of fluorine $\Delta F_3$.

Continue the above procedure until the lower limit of voltage is reached, and record at each step, the discharge voltage, line width, energy sigma and estimated fluorine. Your data sheet should look similar to Table I which is actual data from a Model ELS-5000 laser produced by Cymer, Inc., San Diego, Calif.

TABLE 1

Actual data from ELS-5000 laser. Data from your laser may be different, but will follow the same trends.

| Number of Injects | Cumulative F2* Pressure (kPa) | Average Voltage (Volts) | Linewidth (pm) | Energy Sigma (%) |
|---|---|---|---|---|
| 0 | 18.5 | 790 | 0.44 | 2.5 |
| 1 | 20.5 | 690 | 0.44 | 1.9 |
| 2 | 22.5 | 632 | 0.45 | 1.6 |
| 3 | 24.5 | 618 | 0.46 | 1.5 |
| 4 | 26.5 | 598 | 0.47 | 1.7 |
| 5 | 28.5 | 584 | 0.49 | 1.7 |
| 6 | 30.5 | 575 | 0.49 | 1.7 |
| 7 | 32.5 | 571 | 0.50 | 1.8 |
| 8 | 34.5 | 568 | 0.51 | 1.8 |
| 9 | 36.5 | 567 | 0.52 | 1.8 |

*NOTE: This is 1 percent $F_2$ in a buffer gas, such as Neon or Helium.

Plot the data as a function of discharge voltage. Use the graph to select an operating range. The range should cover about 40 volts. The selection is a trade-off among the four parameters shown on the graph. For example, if low voltage is of over-riding importance, the chosen range might be 570 volts to 610 volts. If low fluorine and minimum line width is of over-riding importance, the chosen range might be 760 volts to 800 volts. If energy reliability is of over-riding importance, the choice would be about 600 volts to 640 volts. A range which provides a reasonable trade-off among all four parameters would be about 595 volts to about 635 volts.

While the invention has been described in connection with what is presently considered to be the preferred embodiments, it is to be understood that the invention is not limited to the disclosed embodiments, but on the contrary, covers various modifications and equivalents included within the spirit and scope of the following claims. Person's skilled in the art will recognize that parameters proportional to or the parameters shown in the Table I example could be substituted. For example, discharge voltage could be used instead of charging voltage. The line width parameter could be full length, half maximum, the 95 percent integral, or any other measure of line width. Other measures of energy stability could be substituted for energy sigma. Therefore, persons of ordinary skill in this field are to understand that all such equivalents are included within the scope of the claims.

What is claimed is:

1. A process for selecting an operating range for a narrow band excimer laser for optimum fluorine concentration, charging voltage, line width and energy sigma, comprising the steps of:
   A. selecting a desired pulse energy, a desired operating range of charging voltage and desired values of energy sigma and line width,
   B. operating the laser at the desired pulse energy until the fluorine concentration is depleted enough so that the charging voltage is at or near a predetermined maximum range,
   C. recording values of the charging voltage, the energy sigma, the average line width for at least 30 pulses,
   D. injecting a quantity of fluorine, said quantity at least sufficient to cause a measurable decrease in the charging voltage necessary to produce the desired pulse energy,
   E. repeating step C.,
   F. repeating steps D and C until the charging voltage is at or near a predetermined minimum range,
   G. utilizing the recorded values of charging voltage, energy sigma, average line width to select an optimal operating range of charging voltage to produce, as closely as possible, the desired range of charging voltage and values of energy sigma and line width.

2. A process as in claim 1 and further comprising plotting the values of line width, energy sigma and fluorine concentration as a function of charging voltage.

3. A process as in claim 1 and further comprising plotting the values of line width, energy sigma and charging voltage as a function of estimated fluorine concentration.

4. A process for selecting an operating range for a narrow band excimer laser for optimum fluorine concentration, charging voltage, line width and energy sigma, comprising the steps of:
   A. selecting a desired pulse energy, a desired operating range of charging voltage and desired values of energy sigma and line width,
   B. operating the laser at the desired pulse energy until the fluorine concentration is depleted enough so that the charging voltage is at or near a predetermined maximum range,
   C. recording values representative of discharge voltage, energy stability, and line width, and estimate the fluorine concentration,
   D. injecting a quantity of fluorine, said quantity at least sufficient to cause a measurable decrease in the charging voltage necessary to produce the desired pulse energy, and record the quantity injected,
   E. repeating step C.,
   F. repeating steps D and C until the charging voltage is at or near a predetermined minimum range,
   G. utilizing the recorded values representing discharge voltage, energy sigma and line width and recorded values of fluorine quantity injected to select an optimal operating range of charging voltage.

5. A process as in claim 4 and further comprising plotting the values representative of line width, and energy stability and fluorine concentration as a function of the values representative of discharge voltage.

6. A process as in claim 4 and further comprising plotting the values representative of line width, energy stability discharge voltage as a function of estimated fluorine concentration.

* * * * *